US007844828B2

(12) United States Patent
Giraud et al.

(10) Patent No.: US 7,844,828 B2
(45) Date of Patent: Nov. 30, 2010

(54) METHOD TO SECURE THE EXECUTION OF A PROGRAM AGAINST ATTACKS BY RADIATION OR OTHER

(75) Inventors: Nicolas Giraud, Louveciennes (FR); Stéphane Rainsard, Louveciennes (FR)

(73) Assignee: Axalto SA, Meudon Cedex (FR)

( * ) Notice: Subject to any disclaimer, the term of this patent is extended or adjusted under 35 U.S.C. 154(b) by 368 days.

(21) Appl. No.: 10/581,843

(22) PCT Filed: Dec. 6, 2004

(86) PCT No.: PCT/IB2004/004030

§ 371 (c)(1),
(2), (4) Date: Jun. 5, 2006

(87) PCT Pub. No.: WO2005/055021

PCT Pub. Date: Jun. 16, 2005

(65) Prior Publication Data

US 2007/0106519 A1 May 10, 2007

(30) Foreign Application Priority Data

Dec. 4, 2003 (EP) .................................. 03293036

(51) Int. Cl.
G06F 11/30 (2006.01)
G06F 11/00 (2006.01)
H04N 7/16 (2006.01)
G06F 12/14 (2006.01)

(52) U.S. Cl. ........................... 713/187; 726/22; 726/23; 726/24; 726/25; 726/26

(58) Field of Classification Search ............. 726/22–26; 713/187

See application file for complete search history.

(56) References Cited

U.S. PATENT DOCUMENTS 5,586,321 A * 12/1996 Shavit et al. ................ 718/102
5,598,530 A * 1/1997 Nagae ......................... 714/21

(Continued)

FOREIGN PATENT DOCUMENTS

EP   0 886 202 B1   6/2003

(Continued)

OTHER PUBLICATIONS

International Search Report dated Apr. 29, 2005 (3 pages).

(Continued)

*Primary Examiner*—William R Korzuch
*Assistant Examiner*—Trang Doan
(74) *Attorney, Agent, or Firm*—Osha Liang LLP

(57) ABSTRACT

A method for verifying execution of a program, wherein the program comprises a first code portion and a second code portion. The method includes entering the first code portion, where the first code portion includes a first plurality of instructions, executing the first code portion, calculating a first checksum during the execution of the first code portion, wherein the first checksum is calculated using information associated with at least one of the first plurality of instructions, comparing the first checksum to a first pre-calculated checksum prior to exiting the first code portion, and exiting the first code portion and entering the second code portion if the first checksum equals the first pre-calculated checksum.

9 Claims, 6 Drawing Sheets

U.S. PATENT DOCUMENTS

| | | | | |
|---|---|---|---|---|
| 6,006,328 | A * | 12/1999 | Drake | 726/23 |
| 6,041,180 | A * | 3/2000 | Perks et al. | 717/151 |
| 6,070,239 | A * | 5/2000 | McManis | 713/187 |
| 6,092,229 | A * | 7/2000 | Boyle et al. | 714/748 |
| 6,678,837 | B1 * | 1/2004 | Quach et al. | 714/38 |
| 6,922,782 | B1 * | 7/2005 | Spyker et al. | 713/161 |
| 6,944,772 | B2 * | 9/2005 | Dozortsev | 713/180 |
| 7,020,798 | B2 * | 3/2006 | Meng et al. | 714/6 |
| 7,082,563 | B2 * | 7/2006 | Gemelli et al. | 714/758 |
| 7,103,779 | B2 * | 9/2006 | Kiehtreiber et al. | 713/187 |
| 7,117,348 | B2 * | 10/2006 | Holmberg et al. | 713/1 |
| 7,168,065 | B1 * | 1/2007 | Naccache et al. | 717/127 |
| 7,246,056 | B1 * | 7/2007 | Brewton | 703/20 |
| 7,287,166 | B1 * | 10/2007 | Chang et al. | 713/187 |
| 7,313,691 | B2 * | 12/2007 | Bantz et al. | 713/155 |
| 7,346,780 | B2 * | 3/2008 | Sinha et al. | 713/187 |
| 7,353,505 | B2 * | 4/2008 | O'Dowd | 717/158 |
| 7,398,553 | B1 * | 7/2008 | Li | 726/22 |
| 2001/0034839 | A1 * | 10/2001 | Karjoth et al. | 713/190 |
| 2002/0023963 | A1 * | 2/2002 | Luu | 235/492 |
| 2002/0196685 | A1 * | 12/2002 | Topham | 365/200 |
| 2003/0005277 | A1 * | 1/2003 | Harding et al. | 713/2 |
| 2003/0033536 | A1 * | 2/2003 | Pak et al. | 713/188 |
| 2003/0103564 | A1 * | 6/2003 | Hanaki | 375/240.03 |
| 2004/0003261 | A1 * | 1/2004 | Hayashi | 713/187 |
| 2004/0015748 | A1 * | 1/2004 | Dwyer | 714/52 |
| 2004/0078589 | A1 | 4/2004 | Giraud | |

FOREIGN PATENT DOCUMENTS

| | | |
|---|---|---|
| EP | 1 316 873 A2 | 6/2003 |
| FR | 2 818 766 | 12/2000 |

OTHER PUBLICATIONS

Davida et al.; "Defending Systems Against Viruses through Cryptographic Authentication"; Proceedings of the Symposium on Security and Privacy, Oakland, May 1-3, 1989, Washington, IEEE Comp. Soc. Press., US, pp. 312-318 (7 pages).

* cited by examiner

METHOD TO SECURE THE EXECUTION OF A PROGRAM AGAINST ATTACKS BY RADIATION OR OTHER

CROSS-REFERENCE TO RELATED APPLICATIONS

This application claims the benefit, pursuant to 35 U.S.C. §119, of Patent Cooperation Treaty Application No. PCT/IB2004/004030 filed on Dec. 6, 2004, which claims priority of European Patent Application No. 03293036.4 filed Dec. 4, 2003.

FIELD OF INVENTION

This invention concerns a method and a device to secure an electronic assembly implementing a program to be protected. More precisely, the purpose of the method is to propose a defence against attacks by radiation, flash, light, laser, glitch or other and more generally against any attack disturbing the execution of the program instructions. These attacks modify the instructions to be executed, resulting in non-execution or incorrect execution of certain parts of the program.

BACKGROUND

When executing a program, attacks for example by laser, glitch or electromagnetic radiation modify the instruction codes executed by the processor, e.g. converting any instruction codop into codop 00h (BRSET0 on 6805, NOP on 8051 and AVR): the program instructions are replaced by inoperative instructions. Consequently, certain sections of the code fail to execute or execute irregularly, for example the execution of inoperative instructions instead, of a security processing sequence, for example in an operating system for smart card. The attacks may disturb the processor operation and cause untimely jumps in the program memory.

This applicant filed a French patent application No. 0016724 on 21 Dec. 2000 concerning a method to secure the execution of a program stored in a microprocessor controlled electronic module, as well as the associated electronic module and integrated circuit card. The solution protected in said application consists in triggering interrupts intermittently and thereby diverting the program execution to protect against possible attacks. This solution offers a good probability of detecting and preventing the attacks by radiation. However, some attacks may not be detected, especially if the attack occurs briefly between two interrupts.

Amongst the known defences, another solution consists in setting flags in a byte of the RAM memory at regular intervals and in checking, at a particular point in the execution of the software, that all flags which should be set are actually set. Setting up this type of defence is tedious, however, since specific volatile memory areas must be allocated and processing added in the code to be protected, wherever this is required. In addition, since attacks of this type are becoming shorter and more precise, the known solutions are becoming less effective. Firstly, the attack may be short enough to have no effect on the setting of flags; execution of a section of the program may therefore be prevented in a way which is totally undetectable. Secondly, the flag verification software may itself be disturbed.

One purpose of this invention is to propose efficient protection even for very short attacks.

Another purpose of this invention is to propose a solution which could be implemented in the current components without adaptation, which consumes few resources and which does not reduce the performance of the assembly in which it is implemented.

SUMMARY OF THE INVENTION

This invention concerns a method to secure the execution of a program in an electronic assembly including data processing means and data storage means, characterised in that it consists in checking the execution of every instruction of at least one portion of said program by performing during the execution of said portion a calculation using predetermined values, depending on or associated with each of said instructions and by comparing the result obtained with a precalculated value.

This invention also concerns an electronic module in which said method is implemented, a card comprising said module and a program to implement said method.

BRIEF DESCRIPTION OF THE DRAWINGS

Other purposes, features and advantages of the invention will appear on reading the description which follows of the implementation of the method according to the invention and of a mode of realisation of an electronic system designed for this implementation, given as a non-limiting example, and referring to the attached drawings in which:

FIG. 3 is a diagrammatic representation of the execution of a program when not faced with an attack, in which the steps of the security method according to one form of realisation of this invention have been demonstrated;

FIG. 4 is a diagrammatic representation of the execution of a program faced with an attack, in which the steps of the security method according to the form of realisation represented on FIG. 3 have been demonstrated;

FIG. 5 is a diagrammatic representation of the execution of a program when not faced with an attack, in which the steps of the security method according to another form of realisation of this invention have been demonstrated;

FIG. 6 is a diagrammatic representation of the execution of a program faced with an attack, in which the steps of the security method according to the form of realisation represented on FIG. 5 have been demonstrated;

FIG. 7 is a diagrammatic representation of the execution of a program when not faced with an attack, in which the steps of the security method according to a variant of the form of realisation represented on FIG. 5 have been demonstrated;

DETAILED DESCRIPTION

The purpose of the method according to the invention is to secure an electronic assembly and for example a portable object such as a smart card implementing a program. The electronic assembly comprises at least processing means such as a processor and storage means such as a memory. The program to be secured is installed in the memory, for example ROM (Read Only Memory) type, of said assembly.

Figure 1:
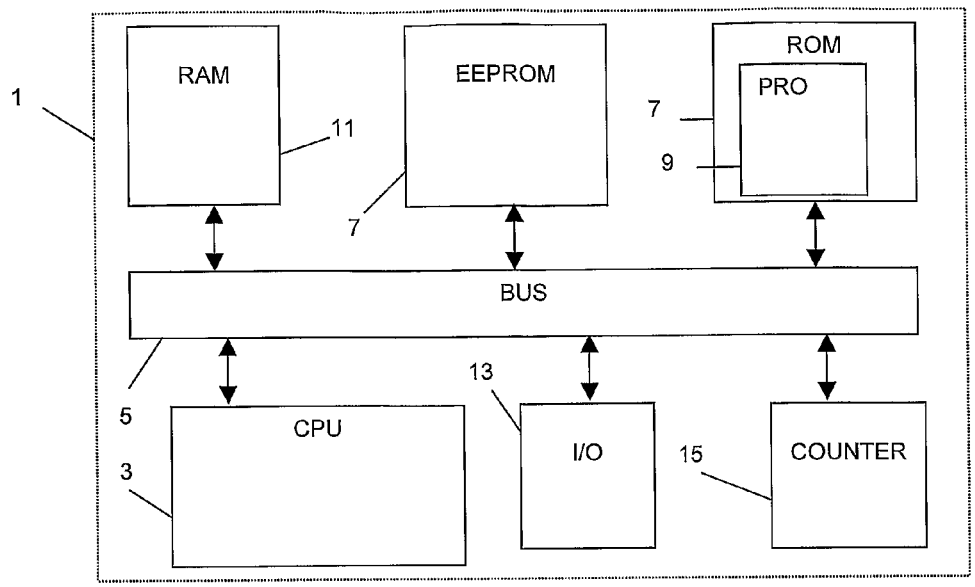
FIG. 1 is a diagrammatic representation of an example of a device in which the method according to this invention is implemented.

As a non-limiting example, the electronic assembly described below corresponds to an onboard system comprising an electronic module 1 illustrated on FIG. 1. This type of module is generally realised as a monolithic integrated electronic microcircuit, or chip, which once physically protected by any known means can be assembled on a portable object such as for example a smart card, microcircuit or integrated circuit card (microprocessor card, etc.) or other card which can be used in various fields.

The electronic module 1 comprises a microprocessor CPU 3 with a two-way connection via an internal bus 5 to a non volatile memory 7 of type ROM, EEPROM, Flash, FeRam or other containing the program PRO 9 to be executed, a volatile memory 11 of type RAM, input/output means I/O 13 to communicate with the exterior, evaluation means 15 such as at least a counter COUNTER.

The method according to the invention consists in checking that the program 9 is fully executed as it is stored in the memory by checking that each instruction in the execution flow is actually executed by the microprocessor 3.

The method according to the invention consists in checking the execution of each instruction of at least a portion of said program by performing during the execution of said portion an arithmetic calculation using predetermined values, depending on or associated with each instruction and by comparing the result obtained with a precalculated value stored in said storage means. A predetermined value means any value which does not depend on the physical characteristics of the system in which the method is implemented and physical characteristics of the execution of said instruction in this system.

The predetermined value which depends on an instruction is, for example, a value which depends on the content, type, function, result and/or on any other characteristic attached to said instruction as such. The content of an instruction is taken to mean any element forming said instruction, including the operating code and the parameters, said content including one, several or all of those elements. The type of an instruction is taken to mean a characteristic of the instruction classifying it in a special instruction category. The function of an instruction is taken to mean the function carried out by said instruction in said program portion concerned. The result of an instruction is taken to mean any value obtained by executing said instruction, if any.

Figure 3:
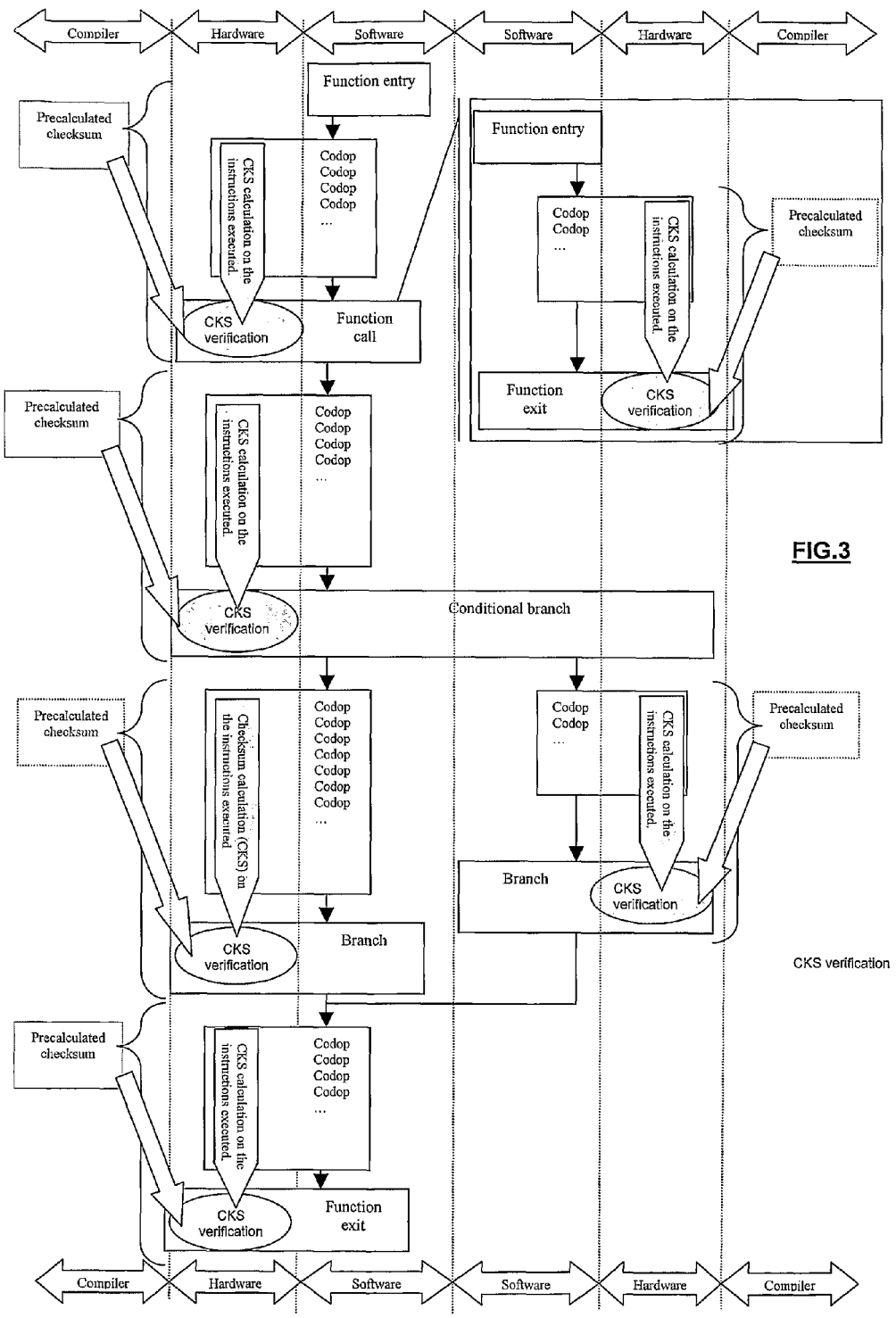
FIGS. 3 to 7: an unshaded rectangle a represents a portion of code executed, a shaded rectangle b represents a portion of code which is not executed. The shaded arrows c represent an attack: their lengths indicate the duration of the attack; their positions indicate the portion of program code attacked. The rectangle d with bold edges represents the detection of an anomaly. The light shaded rectangle e with thin edges represents precalculated data. The brace f represents the scope of a precalculation. The rectangle g with rounded corners represents a code address. The rectangles h in perspective show the status of the stack. The wide shaded arrows i whose pointed ends extend the basic rectangles and the shaded ellipses j represent hardware mechanisms, the unshaded ellipses k with double edge represent software mechanisms. The rectangles l in perspective with bold edges represent software mechanisms on the stack.
Figure 4:
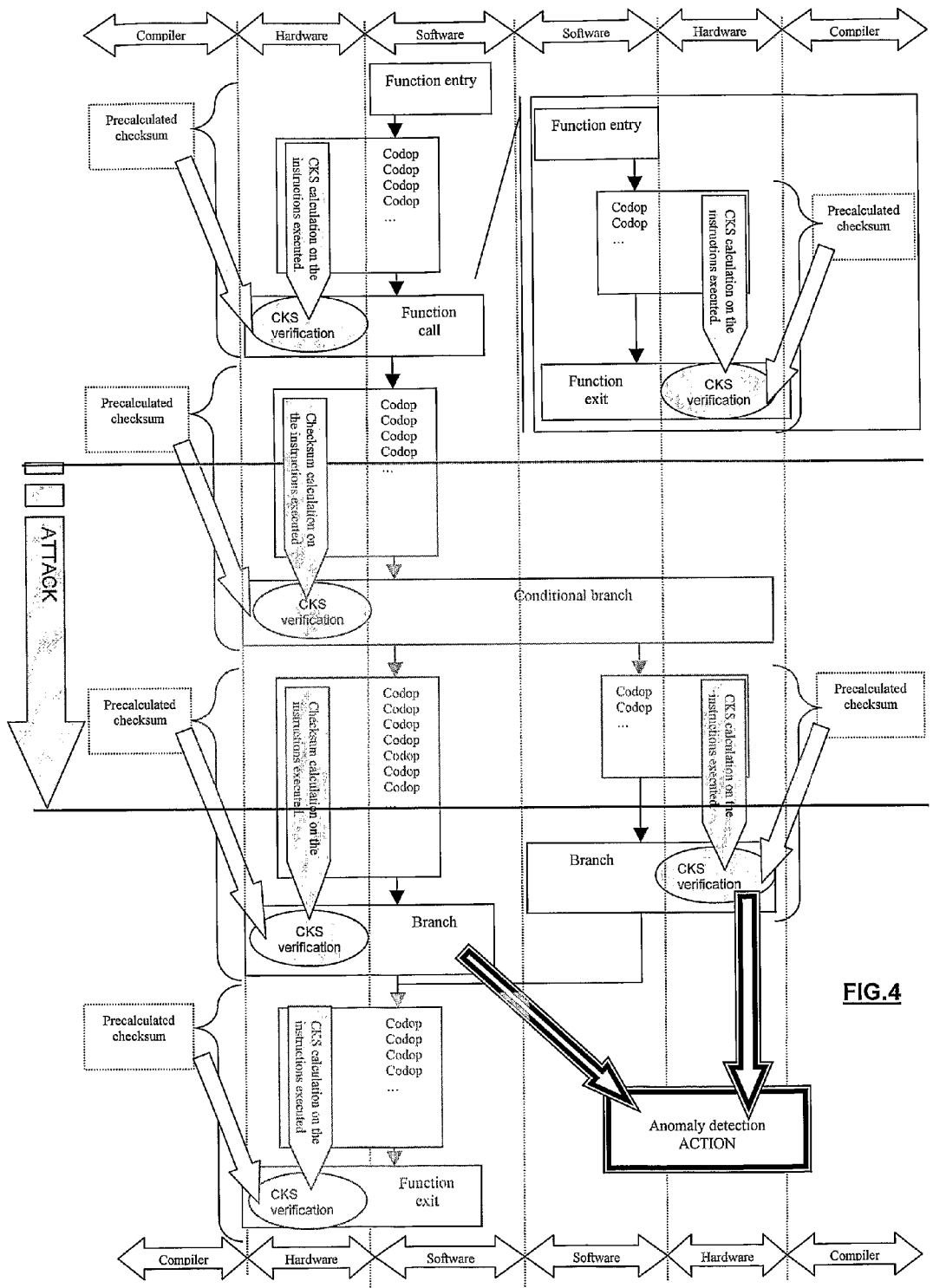

According to one form of realisation according to this invention represented on FIGS. 3 and 4, the method consists in calculating during the microprocessor operation a checksum on the content of the instructions executed during their execution and in verifying the checksum calculated by comparing it with a precalculated value stored in memory. The precalculated value can be, for example, stored in the protected code during the development of the corresponding program. A checksum is a "sum" of a set of data items, i.e. a value calculated which depends on the content of said data, used for verification purposes.

A program comprises numerous conditional tests and routine calls translated into machine code using branch, jump, routine call instructions or equivalent, i.e. instructions creating branches in the execution flow. If conditional tests, routine calls or call returns follow each other, the code section may consist of just a few instructions before the next branch in the tree of possible execution paths. If there is a jump to another routine, the entry point of the routine can be reached by various paths. In this invention, each entry point, jump instruction or equivalent in the program code forms the start of a new code section for the checksum calculation.

To implement a checksum verification mechanism, the method according to this invention performs a precalculation of the checksums on each code portion to be protected bounded by entry or exit points, jump addresses or by branch, jump, routine call or call return instructions, entry in an interruption handling routine or return from said interruption or equivalent.

To apply the method of the present invention to all the code, as shown on FIGS. 3 and 4, this invention uses an especially adapted compiler to perform the checksum precalculation task (brace "precalculated checksum" on FIGS. 3 and 4). Passing in precalculated checksums as parameters of end of code section instructions involves significant modifications to known types of compiler since the processor instruction set is modified.

Figure 2:
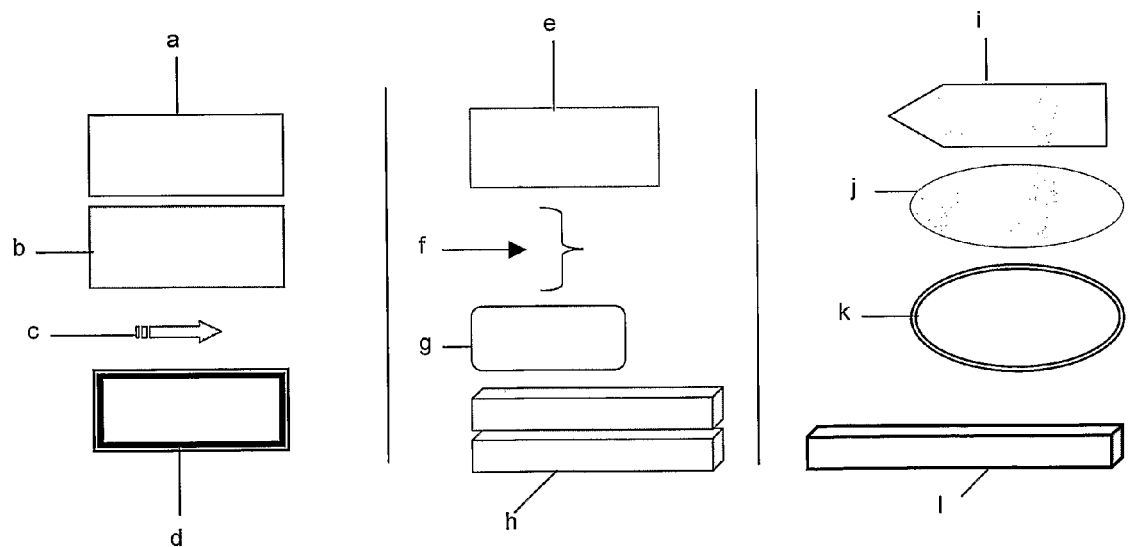
FIG. 2 is a key to interpret the attached

The checksum verification can be carried out by the processor. The method according to this invention therefore supplies to the microprocessor at the end of each code portion to be protected the precalculated checksum which will be compared ("CKS verification" on FIGS. 1 and 2) with the checksum calculated by the processor during execution ("CKS calculation" FIGS. 1 and 2). This value is supplied, for example, as a parameter of the branch, jump, routine call or call return instruction or return of an interruption handling routine or equivalent and/or marking the end of a code portion to be protected or of an instruction marking the end of a code portion to be protected. If a code portion to be protected ends with a jump address, the checksum verification can either be carried out with an instruction added especially in the processor instruction set or simply by adding an unconditional jump instruction to the next instruction.

The verification is carried out during the end instruction of the code portion to be protected with the precalculated value passed in as a parameter. The checksum calculated by the processor during execution is reinitialised for the next code section. If the checksum verification finds a difference, an action is triggered ("Anomaly detection" on FIG. 4).

The checksum verification could also be carried out by the software without modifying the processor instruction set by comparing the value calculated by the processor with the precalculated value. In this case, there is no need to modify the processor instruction set to pass in the precalculated checksum as a parameter of the end instruction of the code section to be protected. The checksum calculated by the processor during execution must simply be accessible to the program in a register or other.

This method, which requires only limited resources, offers the advantage of providing complete protection of the code to be executed including not only the codop but also the parameters.

Figure 5:
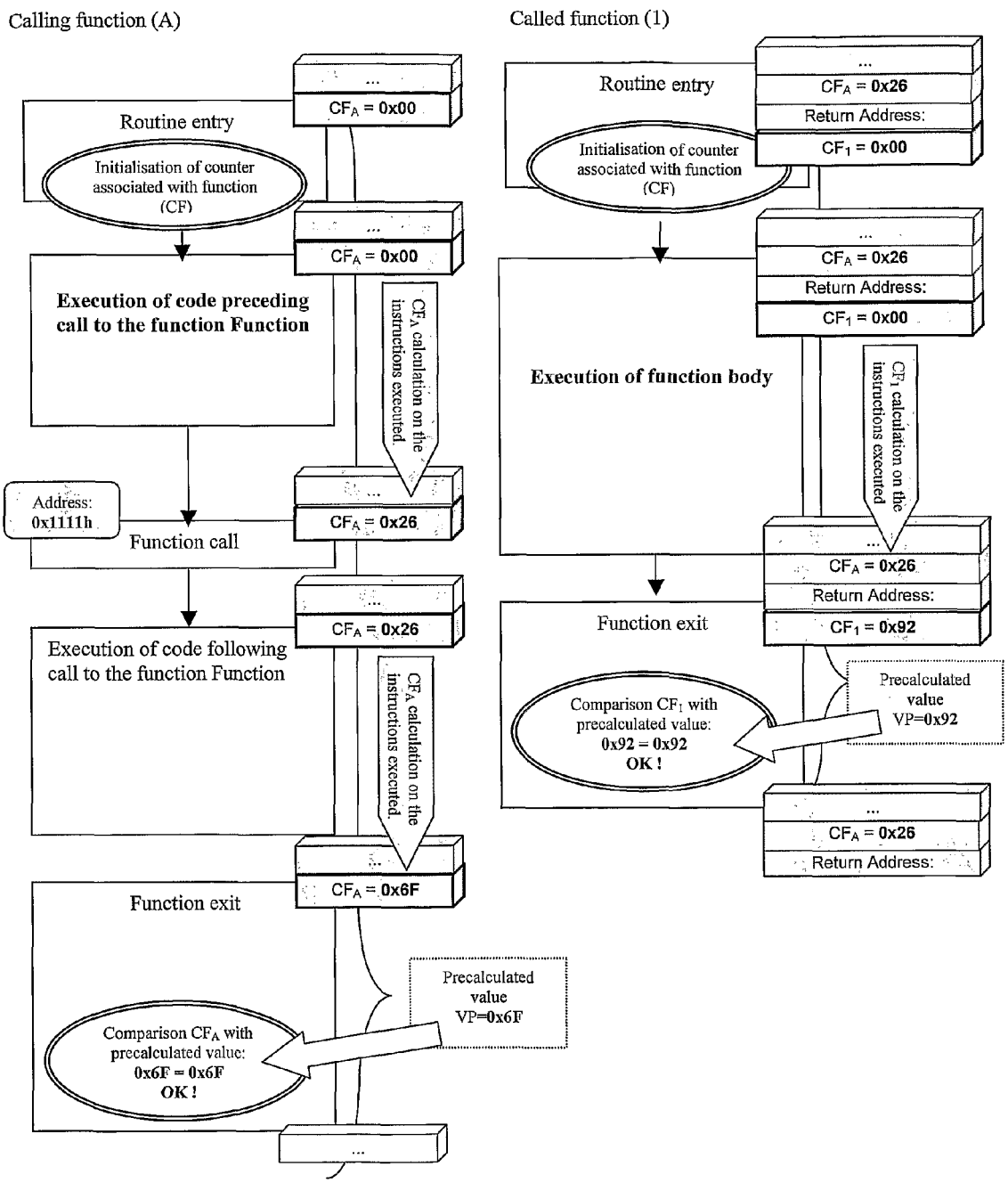
Figure 6:
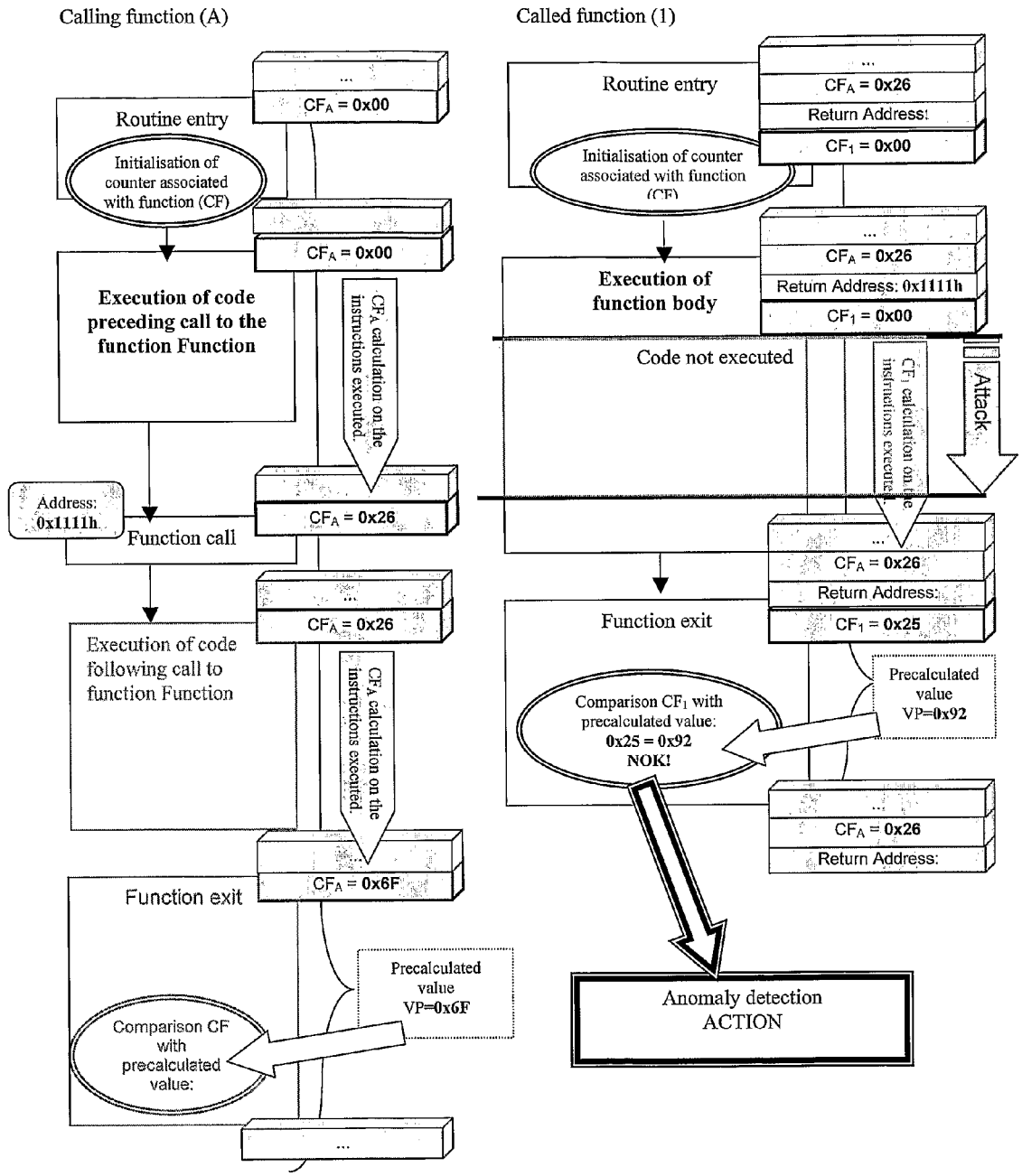
Figure 7:
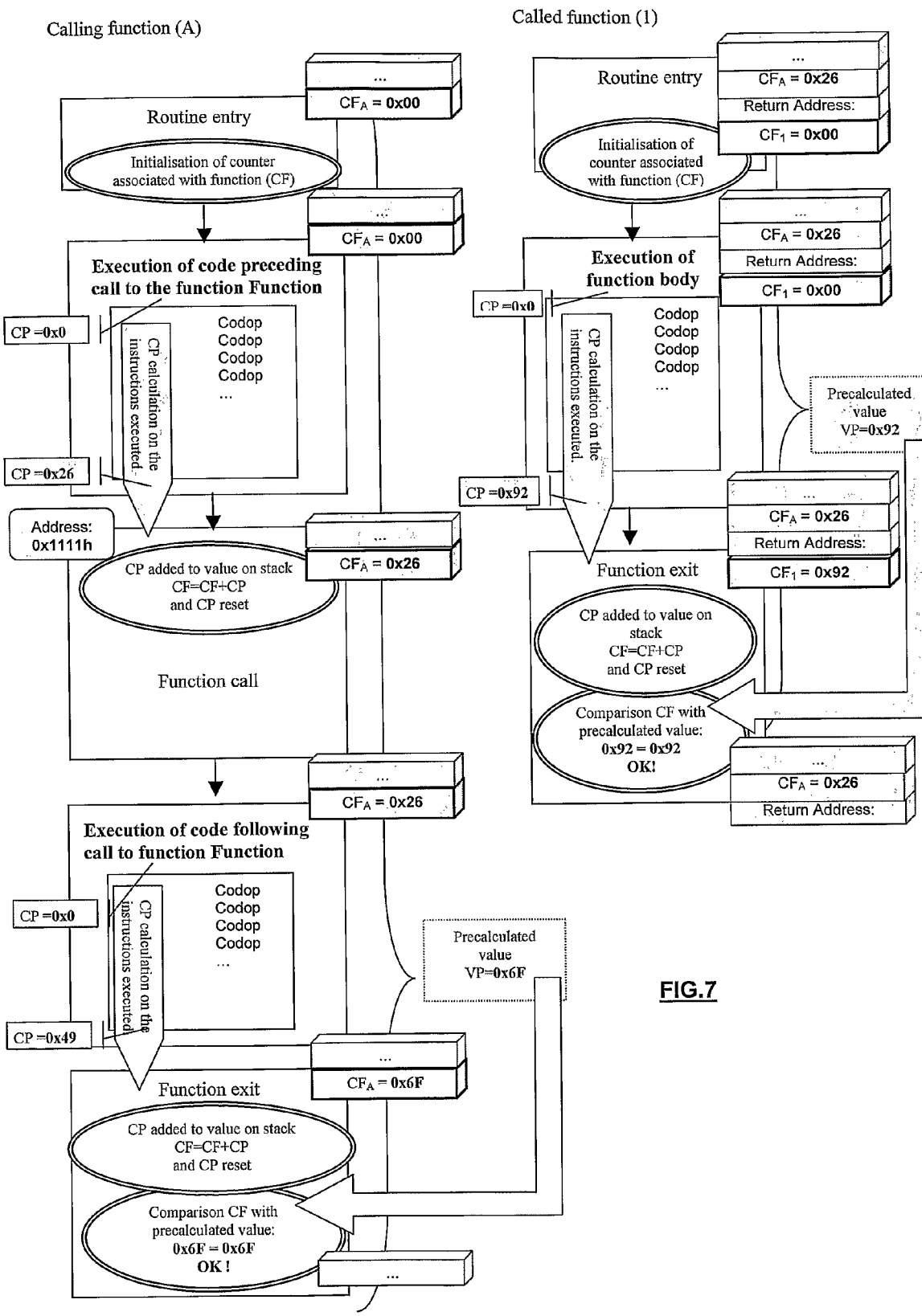

According to another form of realisation of the method according to this invention represented on FIGS. 5 to 7, a counter 15 is assigned to at least a function, a sequence or more generally to at least a portion of said program and, according to one form of realisation, to each portion, at the start of its execution. A program portion comprises at least one instruction. In the remainder of the description, as an illustration, the portion considered is a function. The method consists in the processor incrementing said counter, when executing each instruction of said function in progress, by a value specific to the instruction executed. At the end of the function, the value reached, result of the instruction sequence executed, is checked by comparison with a value precalculated during program development and written in the protected code.

The method according to said form of realisation can be implemented without adding or modifying the processor instruction set. The method can also be implemented without adapting the compiler.

At the start of each function, a counter is assigned to the function in a data structure which could be the processor stack. The counter is initialised to 0 or a value determined for the function ("Counter initialisation" on FIGS. 5 to 7). For each instruction in the function body executed before the call return instruction, the function counter is incremented by a value specific to the instruction ("CF or CP calculation" on FIGS. 5 to 7). At the end of the function, the value reached by the counter is compared with the expected value, precalculated and used as reference value in the software ("CF comparison" on FIGS. 5 to 7).

As shown on FIG. 6, if an attack takes place during the function, the instructions are not executed according to the sequence planned in the program and the counter value at the end of the function (CF1=0x25 on FIG. 6) is different from the expected and checked value (Precalculated value VP=0x92 on FIG. 6); the attack is therefore detected ("Anomaly detection" on the figure) and a specific action is performed by the program or the processor. If the check does not detect an anomaly, the function counter is deassigned in the data structure (on FIG. 5, counter CF1 is deassigned).

The function code consists of numerous conditional tests and routine calls or equivalent, i.e. instructions which create branches in the execution flow. To obtain the same value for the counter at the end of the function, irrespective of the execution path, the various possible execution branches must be balanced.

The counter incrementation value for an instruction can be the machine code of the instruction (operating code+parameter values). In this case, the count calculated on the instructions executed corresponds to a checksum calculated on the instructions in the execution flow belonging to the function. The instructions executed in the functions called or executed by interruption are taken into account in the counters of these functions and are therefore not taken into account in the counter of the calling or interrupted function.

The balancing of all possible execution paths in the function must be carried out in order to obtain the same value of the counter at the end of the function. This balancing is complicated due to the fact that the instructions are not interchangeable. Consequently, it will often be necessary to add one or more instructions whose sole purpose is to balance one branch with respect to another. This solution increases the size of the code, to a greater or lesser extent, due to the rebalancing of the branches.

Another solution consists in defining instruction classes which have the same incrementation value. These classes with the same increment include similar instructions, e.g. the class of conditional branches, the class of arithmetic and logic operations, the class of jumps and function calls. The NOP instruction will have increment value 0; during an attack which would convert the program instructions into NOP, the counter will not be incremented, which means that the attack will be detected. This mechanism can be used to check that each instruction of the execution path within a function executes correctly.

Grouping instructions into classes with the same increment value makes it easier to balance the branches: if each branch carries out different but similar operations, they may use instructions which have equal increment values. In addition, balancing can be carried out by using instructions which are different but which belong to the same class as those used in another branch. For example, a conditional branch in one branch can be balanced with an unconditional branch to the next instruction in another branch. The instruction parameters are not taken into account when incrementing the counter, which also makes it easier to balance the branches. The branches can also be balanced by direct access to the function counter if there is a large difference.

Checking the value of the function counter, performed when leaving the function or during intermediate checks, can be carried out by software by reading the value of the current function counter, incremented by the processor during execution, and by comparing it with the precalculated value. This check can also be carried out by the hardware by supplying the precalculated check value to the processor. This value can be supplied as parameter of a modified call return instruction or of an instruction especially added to the processor instruction set. The instruction performs the check by comparing the precalculated value supplied as argument with the value of the current function counter.

Assignment of the function counter in a data structure and initialisation of this counter to 0 or to another specific value can be carried out by software or hardware by the processor in a modified function call instruction.

According to a variant, the method consists in initialising at the start of each routine a pointer to the routine counter after saving its previous value. On leaving the routine, the pointer is reset to its previous value (the address of the calling function counter). This mechanism can be used to perform intermediate checks of the counter during the routine and especially before a sensitive operation. If the counter value is not the value expected at this point in the execution of the routine, this means that the execution of the routine has been disturbed.

Assigning the function counter on the processor stack is useful if the stack is only used to save the return addresses and possibly some registers during function calls. In this case, the counter remains on the top of the stack in the function body and it is therefore unnecessary to maintain a pointer to this counter in order to perform checks during the routine. In another mode of realisation, the routine counters can be assigned in a data structure other than the processor stack (e.g. a compiler stack) with a means of finding the counter of the routine being executed (possibly a stack pointer).

One mode of realisation of the method illustrated on FIG. 7 consists in using a global counter (CP on FIG. 7) of the processor to perform the counting. Incrementation when executing the instructions is carried out by the processor in this global counter (CP). On each function call or interrupt handling, the value of the global counter is added to the calling or interrupted function counter and reset to 0 ("CP added to value on stack CF=CF+CP and CP reset" on figure). During a function return or interrupt return, the final value of the function counter is obtained by adding the value of the global counter before the check, then the global counter is reset to 0 for the calling or interrupted function.

One advantage of the method according to the form of realisation illustrated on FIGS. 5 to 7, called the check count method, lies in the fact that the check count is specific to each routine. Only the instructions of the routine are taken into account, the called routines and in particular the random or desynchronisation routines are not taken into account, which makes branch balancing easier since this only has to be carried out inside the body of each routine. In addition, the method can be limited to those functions where it is considered to be necessary, which further reduces the scale of the balancing task.

Grouping instructions into classes with the same increment value makes branch balancing easier. The instruction parameters are not taken into account when incrementing the counter, which also makes branch balancing easier.

The method can be implemented without modifying the processor instruction set: it can even be implemented without modifying the processor, therefore on current processors.

Verification of the check count can be carried out at the end of the routine only, thereby limiting the increase in code size.

What is claimed is:

1. A computer-implemented method for verifying execution of a program comprising a plurality of code portions to be verified, the method comprising:
    entering a first code portion, wherein the first code portion comprises a first plurality of instructions beginning with a first entry point and ending with a first instruction that creates a first branch in the execution flow;
    executing, by a processor, the first code portion;
    calculating a first checksum during the execution of the first code portion, wherein the first checksum is calculated using first operating code, wherein at least one of the first plurality of instructions comprises the first operating code;
    comparing the first checksum to a first pre-calculated checksum during execution of the first instruction that creates the first branch in the execution flow and prior to exiting the first code portion,
        wherein the first pre-calculated checksum is passed as a parameter of the first instruction,
        wherein the first pre-calculated checksum is calculated, during compilation of the program, using the first operating code, wherein the first operating code is generated during compilation of the program;
    exiting the first code portion and entering the second code portion when the first checksum equals the first pre-calculated checksum, wherein the second code portion comprises a second plurality of instructions beginning with a second entry point and ending with a second instruction that creates a second branch in the execution flow; and
    detecting an anomaly when the first checksum is not equal to the first pre-calculated checksum, wherein detection of the anomaly results in the second code portion remaining unexecuted.

2. The method of claim 1, further comprising:
    executing the second code portion;
    calculating a second checksum during the execution of the second code portion, wherein the second checksum is calculated using second operating code, wherein at least one of the second plurality of instructions comprises the second operating code;
    comparing the second checksum to a second pre-calculated checksum during execution of the second instruction that creates the second branch in the execution flow and prior to exiting the second code portion; and
    exiting the second code portion if the second checksum equals the second pre-calculated checksum.

3. The method of claim 1, wherein the first instruction in the first plurality of instructions to be executed prior to exiting the first code portion is modified to compare the first checksum to the first pre-calculated checksum.

4. The method of claim 1, wherein comparing the first checksum to the first pre-calculated checksum is performed after all of the first plurality of instructions have been executed.

5. A card comprising an electronic module, the electric module comprising:
    a program, comprising a first code portion and a second code portion;
    a first pre-calculated checksum;
    a processor configured to execute the program, wherein executing the program comprises:
        entering the first code portion, wherein the first code portion comprises a first plurality of instructions beginning with a first entry point and ending with a first instruction that creates a first branch in the execution flow;
        executing the first code portion;
        calculating a first checksum during the execution of first code portion, wherein the first checksum is calculated using operating code, wherein at least one of the first plurality of instructions comprises the operating code;
        comparing the first checksum to the first pre-calculated checksum during execution of the first instruction that creates the branch in the execution flow and prior to exiting the first code portion, wherein the first pre-calculated checksum is passed as a parameter of the first instruction,
            wherein the first pre-calculated checksum is calculated during compilation of the program using the operating code, wherein the operating code is generated during the compilation of the program;
        exiting the first code portion and entering the second code portion when the first checksum equals the first pre-calculated checksum, wherein the second code portion comprises a second plurality of instructions beginning with a second entry point and ending with a second instruction that creates a second branch in the execution flow; and
        detecting an anomaly when the first checksum is not equal to the first pre-calculated checksum, wherein detection of the anomaly results in the second code portion remaining unexecuted.

6. A computer-implemented method for verifying execution of a program, the method comprising:
    entering a first routine, wherein the first routine comprises a plurality of instructions beginning with a first entry point and ending with a first instruction that creates a first branch in the execution flow, and each of the plurality of instructions is associated with a value;
    initializing a counter associated with the first routine, prior to executing the first routine;
    executing, by a processor, the first routine, wherein the counter is incremented by the value associated with each of the plurality of instructions executed during the execution of the first routine;
    comparing a value of the counter to a pre-calculated value during execution of the first instruction that creates the branch in the execution flow and prior to exiting the first routine, wherein the pre-calculated value is passed as a parameter of the first instruction and wherein the pre-calculated value is calculated during compilation of operating code of the program associated with the at least one of the first plurality of instructions;

exiting the first routine and entering the second routine when the value of the counter equals the pre-calculated value, wherein the second routine comprises a second plurality of instructions beginning with a second entry point and ending with a second instruction that creates a second branch in the execution flow; and detecting an anomaly when the value of the counter is not equal to the pre-calculated value, wherein detection of the anomaly results in the second routine remaining unexecuted, wherein the first routine comprises the first branch and a third branch, and wherein the first branch and the third branch are balanced to have the value of the counter resulting from executing instructions in the first branch equal to the value of the counter resulting from executing instructions in the third branch.

7. The method of claim 6, wherein the value associated with each of the plurality of instructions is unique.

8. The method of claim 6, wherein the value associated with a first one of the plurality of instructions is the same as the value associated with a second one of the plurality of instructions, if a type of the first one of the plurality of instructions is the same as a type of the second one of the plurality of instructions.

9. A card comprising an electronic module, the electronic module comprising:

a program comprising a first routine and a second routine;

a value of a first pre-calculated counter;

a processor configured to execute the program, wherein executing the program comprises:

entering the first routine, wherein the first routine comprises a plurality of instructions beginning with a first entry point and ending with a first instruction that creates a first branch in the execution flow, and each of the plurality of instructions is associated with a value;

initializing a counter associated with the first routine, prior to executing the first routine;

executing the first routine, wherein the counter is incremented by the value associated with each of the plurality of instructions executed during the execution of the first routine;

comparing a value of the counter to a pre-calculated value during execution of the first instruction that creates the branch in the execution flow and prior to exiting the first routine, wherein the pre-calculated value is passed as a parameter of the first instruction and wherein the pre-calculated value is calculated during compilation of operating code of the program associated with the at least one of the first plurality of instructions;

exiting the first routine and entering the second routine when the value of the counter equals the pre-calculated value, wherein the second routine comprises a second plurality of instructions beginning with a second entry point and ending with a second instruction that creates a second branch in the execution flow; and detecting an anomaly when the value of the counter is not equal to the pre-calculated value, wherein detection of the anomaly results in the second routine remaining unexecuted, wherein the first routine comprises a first branch and a third branch, and wherein the first branch and the third branch are balanced to have the value of the counter resulting from executing instructions in the first branch equal to the value of the counter resulting from executing instructions in the third branch.

* * * * *